Dec. 3, 1968  W. S. SAUNDERS  3,414,195
SWEEPING JET WING AIRCRAFT WITH ACTUATOR STRIP FLAP
AND EMERGENCY VTOL CAPABILITY
Original Filed May 24, 1965  3 Sheets-Sheet 3
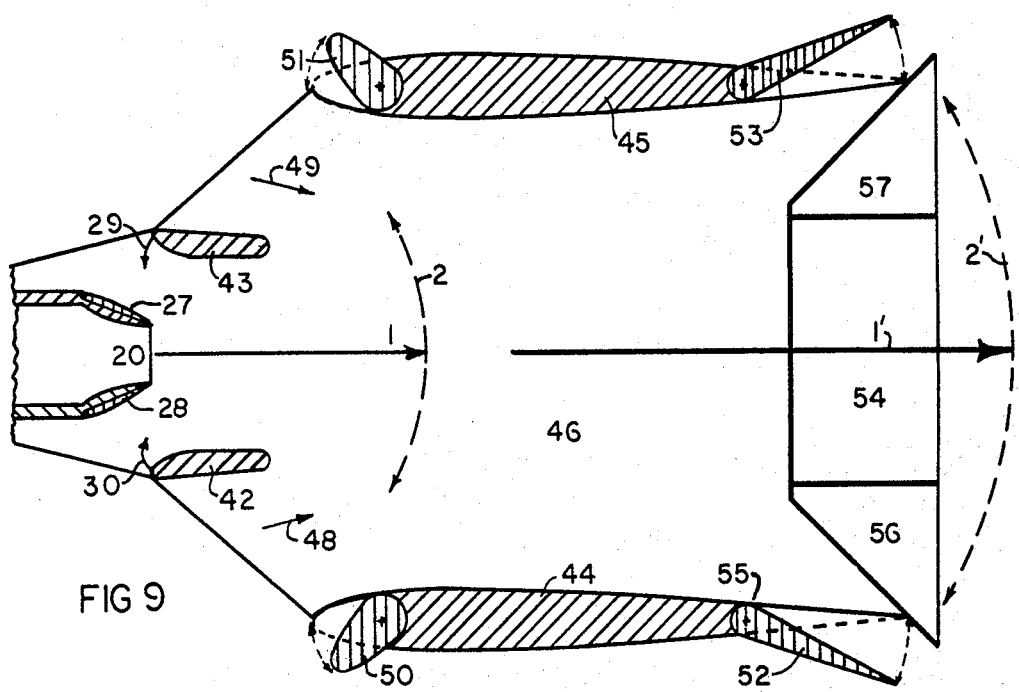
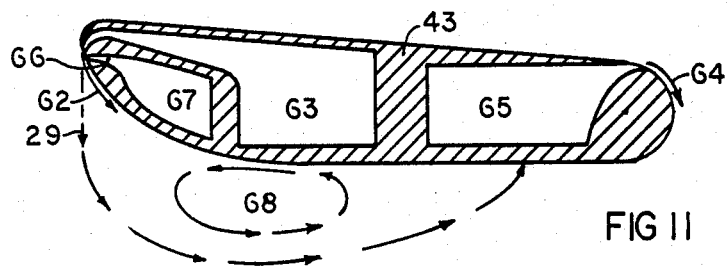
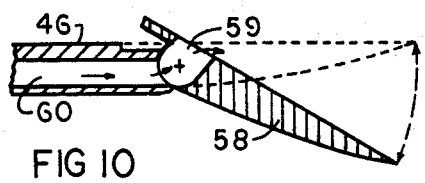
INVENTOR
WALTER SELDEN SAUNDERS
ATTORNEY

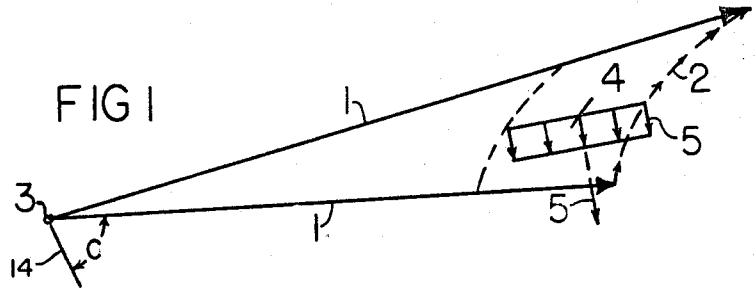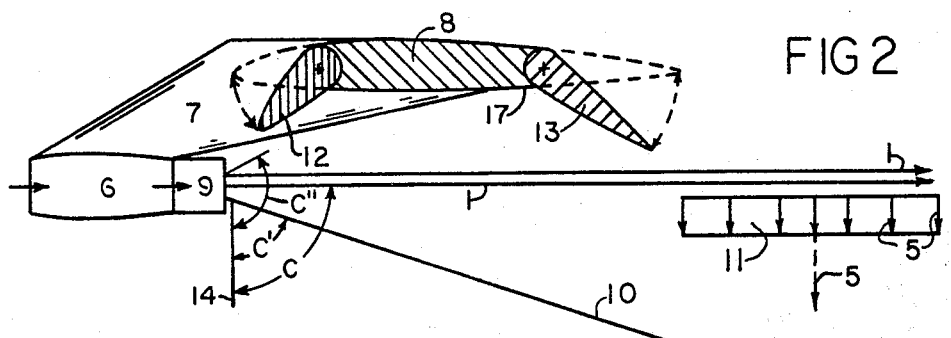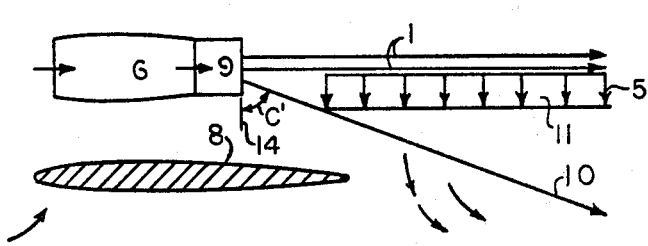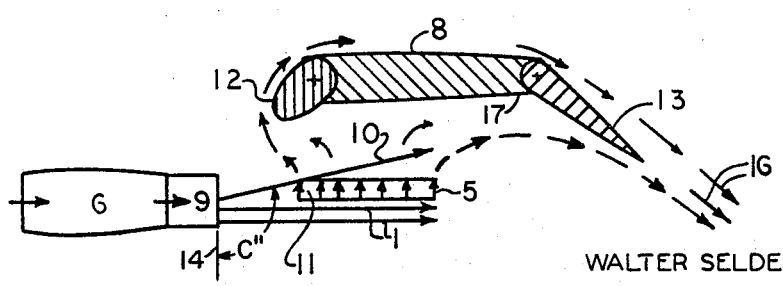

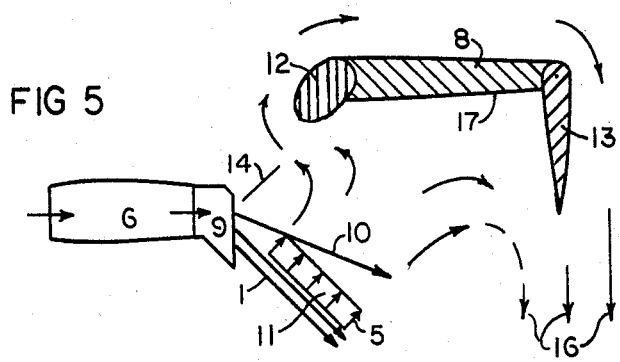
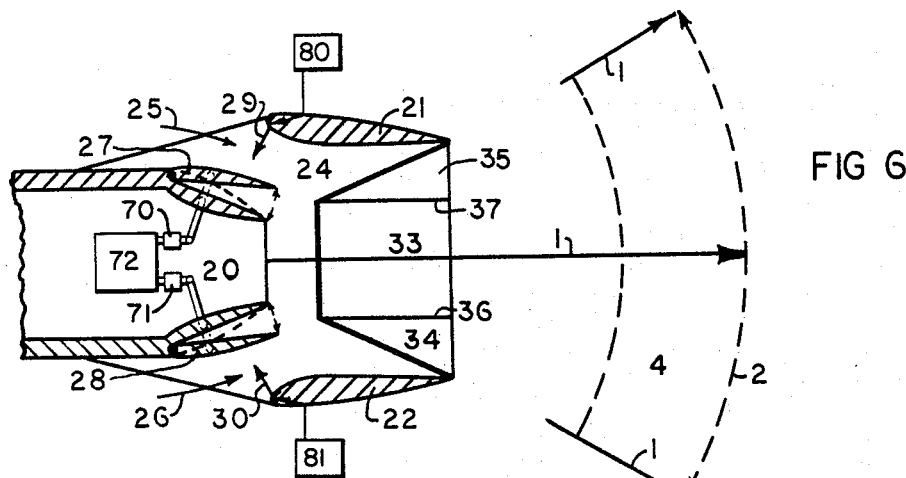
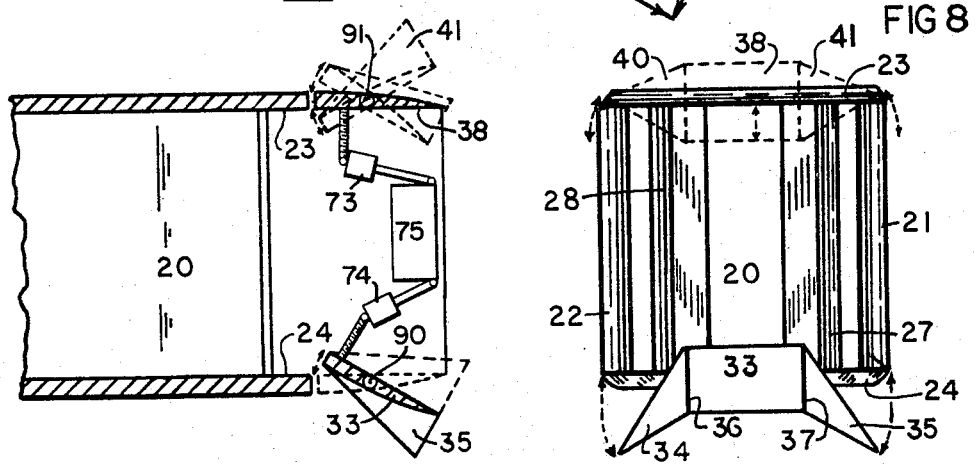
INVENTOR
WALTER SELDEN SAUNDERS

United States Patent Office 3,414,195
Patented Dec. 3, 1968

3,414,195
SWEEPING JET WING AIRCRAFT WITH ACTUATOR STRIP FLAP AND EMERGENCY VTOL CAPABILITY
Walter Selden Saunders, 2316 Stadium Road, Charlottesville, Va. 22903
Application May 24, 1965, Ser. No. 457,919, now Patent No. 3,276,724, dated Oct. 4, 1966, which is a continuation-in-part of application Ser. No. 136,293, Sept. 6, 1961, now Patent No. 3,194,512. Divided and this application June 17, 1966, Ser. No. 569,780
The portion of the term of the patent subsequent to July 13, 1982, has been disclaimed
19 Claims. (Cl. 239—11)

ABSTRACT OF THE DISCLOSURE

In connection with a sweeping jet wing aircraft, the method of sweeping at least a portion of the jet efflux in such a way that the direction of the induced flow will be transverse to the direction of the jet efflux and the direction of sweeping.

---

This invention relates to jet wing aircraft and is a continuation-in-part of my copending application Ser. No. 136,293 filed September 6, 1961, now Patent No. 3,194,-512.

This application is a division of application Ser. No. 457,919, filed May 24, 1965, now Patent No. 3,276,724.

The object of this invention is to provide a jet wing aircraft with improved STOL (short take off and landing) performance.

A further object of the invention is to provide an aircraft with an emergency VTOL (vertical take off and landing) capability.

Yet a further object is to provide an efficiently cruising aircraft with a high thrust to weight propulsion system.

Still another object is to provide an aircraft with an emergency STOL capability in the event of engine failure.

These and other objects will become apparent as the specifications proceed.

In the drawings:

FIGURE 1 is a diagrammatic representation of a conically sweeping jet showing the definition of the actuator strip.

FIGURES 2, 3, 4, and 5 show the spatial relationship between a schematic jet engine and an aircraft wing section as viewed from the side.

FIGURE 6 is a top view of a section of a primary sweep generator.

FIGURE 7 is a side view of a section taken through the center of the sweep generator of FIG. 6.

FIGURE 8 is an end view of the sweep generator of FIG. 6.

FIGURE 9 is a top view of a section taken through a sweep generator incorporating a first stage thrust augmentation duct.

FIGURE 10 is a side view of section through a modified lower end plate 46 of FIG. 9.

FIGURE 11 is a top view of an enlarged section through the airfoil 43 of FIG. 9.

FIG. 1 is a diagrammatic representation of sweeping jet 1, similar to the jet 9 in FIG. 4 of my copending application No. 136,293. As explained in this application a jet sweeping through a conical surface with large coning angle C with respect to axis of rotation 14 will induce a a flow that is substantially transverse to the initial direction of the jet and also substantially transverse to the direction of sweep of the jet. The sweep of the jet may be characterized by the sweep path 2 shown in FIG. 1 which is the imaginary path traced out by a vector that originates at the jet nozzle 3 and is coincident with the initial direction of the jet. As the direction of the jet is changed, the jet is said to sweep along the sweep path 2. An actuator strip 4 may now be defined as a section of the surface swept out by the jet 1. The surrounding fluid in the vicinity of the actuator strip is induced to flow in a direction more or less perpendicular to the strip as shown by the arrow 5 in FIG. 1. In the case of a sweep path defined by a large coning angle C, the induced flow across the actuator strip 4 is in a direction from the convex side to the concave side of the strip (more or less opposite to the direction in which the apex of the full cone is pointing).

As pointed out in the aforementioned application, many types of sweeps will produce a transverse flow effect that is stable and exists for a substantial distance along the sweeping jet. Furthermore, the nozzle of the jet itself may move to produce this effect. Or the effect could be produced by a series of nozzles that are progressively energized by a system of valves comprising a corporate power divider in such a manner that the resultant jet is made to sweep along the row of nozzles. The initial cross section and rotation of the jet may also be specially designed to produce a more efficient transverse flow as explained previously. However, for the purposes of the present invention, I have determined that a jet having two thirds of its efflux sweeping along a path with coning angle of 90° and only one third of its efflux sweeping along a path with coning angle of 60° will produce a stable actuator strip substantially similar to that produced by a jet whose entire efflux is at 60° coning angle, provided that the sweep is carried out at a sufficiently high rate of speed.

In the instant invention, a jet engine 6, FIG. 2, is supported by a pylon 7 below the wing section 8 of an otherwise conventional aircraft. The jet exhaust is acted upon by the aerodynamic surfaces of the sweep generator 9 that cause approximately two thirds of the jet 1 to sweep back and forth in a sweep path comprising an arc in the plane of the wing. About one third of the jet 10 is deflected downward so that its sweep path is defined by the coning angle C' between 10 and the vertical direction substantially perpendicular to the chord of the wing 8. A section of the actuator strip 11 is thereby positioned behind the trailing edge of the wing so that the flow in this vicinity is induced downward as shown by the arrows 5.

If the wing is now submerged in the flow field resulting from the forward motion of the aircraft, the flow induced by the actuator strip 11 produces an effect similar to that which would occur if the down wash behind the wing were produced by a conventional jet flap. This super-circulation is produced about 8 and the STOL performance of the aircraft is greatly increased by the use of the actuator strip flap. This arrangement enjoys many advantages over the conventional jet flap, the most important being the elimination of the inefficient ducting inside the wing required by the conventional jet flap.

Since the actuator strip flap replaces the jet flap the effect of an oscillating jet flap described in my Patent U.S. 3,168,997 may also be produced by periodically reversing the direction of flow induction 5 of the actuator strip 11 in FIG. 2. For example, this may be accomplished by switching 10 from a coning angle C' of about 60° to a coning agle C" of about 120° taking care that the jet 10 does not interfere excessively with the wing 8. A sweep generator to do this will be described later. The oscillating actuator strip flap may be especially useful when the aircraft is operating in ground effect.

The efficiency of the actuator strip flap shown in FIG. 2 may be improved by the use of conventional flaps 12 and 13 at the leading and trailing edges of the wing 8.

These flaps may be slotted or provided with other forms of BLC (boundary layer control) in the usual way. The nose flap 12 is particularly important for thrust recovery. As is well known from jet flap experience, the presence of the jet flap causes a reduced pressure at the nose of the wing 8 which delivers a thrust to the wing. The actuator strip flap will also deliver this form of thrust to the wing and so a net thrust gain is possible. This is very important for STOL operation as the correct lift-thrust balance must be obtained rather than just high lift alone. Hence the importance of an efficient design for 12.

The trailing edge flap 13 helps to prevent the leakage of surrounding flow between the wing 8 and the actuator strip 11. The leakage can reduce the efficiency of the actuator strip flap. The effectiveness of 13 can be improved by providing for a small amount of the efflux of the jet engine 6 to run along the bottom of the wing and off the flap 13. This provides an auxiliary jet flap to help prevent the aforementioned leakage. Alternatively, a small jet flap could be propagated from inside the wing 8 in the usual way.

The jet engine 6 may be mounted above the wing 8 as shown in FIG. 3 in such a manner that the actuator strip 11 pumps the air behind the wing in a downward direction 5 thereby creating the actuator strip flap. The engine 6 in FIG. 3 is supported by a horizontal pylon extending from the fuselage of the aircraft which is not shown in the figure. Of course the engine could be fixed integral with or buried in the wing of the aircraft and still produce the actuator strip flap effect. Similarly, the engine could be remotely located and connected by ducts to suitably positioned nozzles from which an actuator strip flap could be generated.

In FIG. 4, a different mode of operation is shown. The engine 6 is supported underneath the wing as before, however the direction of the actuator strip 11 is reversed as 10 the upper third of jet 1 is deflected at a coning angle C″, an angle of about 120°. Furthermore, the sweep speed is increased so that the actuator strip 11 is moved closer to the forward part of the wing 8. The upwardly induced flow 5 is now turned backward by the wing 8. Thus, a thrust and lift augmentation is obtained by the direct contact of the wing and the induced flow, as opposed to the operation shown in FIG. 2 where the wing 8 receives the force from the interaction of the surrounding flow and the flow induced by the actuator strip flap.

Both of the above modes of flow are taught by my copending application No. 136,293. For example, FIGS. 13 and 14 of that application disclose a form of aircraft in which an actuator strip flap formed by the two rear engines would be operating at the trailing edge of the delta wing 25 during STOL operation. For VTOL operation this aircraft utilizes the substantially 90° deflection of the directly induced flow from a more or less cylindrical actuator strip whose axis is in the vertical plane.

The deflection of this flow is accomplished by the aerodynamic action of the flat underside of the delta wing. In the present invention, the wing 8 of the aircraft of FIG. 4 is the aerodynamic surface that is used to deflect the flow directly induced by the actuator strip of the sweeping jet wing. Since the wing 8 must be present in the aircraft for cruising flight, its use as a deflector may be obtained at minimum weight penalty. Furthermore, this deflection increases both thrust and lift.

As the flow from the actuator strip contacts the wing it spreads out in the spanwise direction. Thus, by deflecting the trailing edge flap 13, a conventional jet flap may be produced as shown by the arrows 16, FIG. 4. The flap thus formed operated much like that described in NASA TN D-943 (1961). However, the jet flap in the instant invention is much superior to that tested by NASA because additional thrust and lift are obtained as a result of the action of the actuator strip.

If the plane of the actuator strip 11 in FIG. 4 were tilted downward approximately 45° as in FIG. 5, a component of direct lift as well as thrust would be realized at the jet engine 6. If now the flaps 12, 13 on the wing were suitably adjusted and provided with adequate BLC, the induced flow may be deflected downward in such a way that the drag on the wing exactly balances the thrust on the engine. Since a large lifting force is also applied to the wing by the deflected flow, hovering or vertical flight is possible. Of course some provision must be made to provide controlling forces and to balance out the pitching moments involved, however these techniques are well known in the art of VTOL aircraft and need not be described in detail. It is not necessary to tilt nozzle 9 downward to obtain actuator strip 11 illustrated in FIG. 5. If the lower portion of jet 1 were deflected downward at an angle of about 60° and the upper portion of jet 1 were deflected downward at an angle of about 30° the actuator strip 11 would be formed and would produce an induced flow indicated by the arrows 5. Means of deflecting a part of jet 1 downward at an angle of 30° and a part downward at an angle of about 60° are illustrated in FIG. 7.

The chief difficulty encountered with the modes of operation described in FIGS. 4 and 5 is occasioned by the heating of the wing by the exhaust of the jet engine. This problem may be solved by using only relatively cool (bypass) air from the jet engine, or by providing cooling of the wing, or by using heat resistant materials in the wing structure, etc. Actually, the mixing of the jet in the actuator strip interaction tends to lower its temperaure and so mitigate the problem. Still, the use of any of these solutions tends to involve design compromises and trade offs that reduce the overall efficiency of the aircraft.

In the present invention, the above tradeoffs need not be made, since it is only necessary to use the modes of FIGS. 4 and 5 during emergency conditions. Since the wing will be subject to only a short and occasional heating, an emergency cooling system with a limited capacity can be utilized. Thus, weight and volume need not be excessively compromised.

The emergency wing cooling system may take many forms. It could simply reside in the heat sink capacity of the wing structure itself. Or a transpirational system could be used that would eject a limited amount of cooling fluid through pores in the skin of the wing. Alternatively, an ablative material could be used on the surface of the wing as at 17, FIGS. 4 and 5. The material could add to the structural properties of the wing and thereby keep its weight penalty to a minimum. After the emergency system was activated, the material could be replaced and the wing reconditioned.

Engine failure during takeoff and landing operations presents a serious emergency situation for most multi-engine STOL aircraft. Not only does the airplane suffer a loss in thrust and lift, but it is usually subject to large and sudden yawing and rolling moments. In the instant invention these problems can be corrected by coverting a suitable engine from the mode described in FIG. 2 to that in FIG. 4. For example, if a four engine aircraft embodying the present invention were to lose a port engine, the remaining engine on the port side could be converted from the mode of FIG. 2 to that of FIG. 4, and the sweep amplitude in the plane of the wing could be increased slightly. Thus, the port wing would be subject to additional lift and thrust and the actuator strip flap would be replaced by a jet flap over most of the span of the wing. Therefore, the aircraft may be trimmed and flown long enough in this new mode to prevent an accident.

For some designs of aircraft this sequence of events must take place too rapidly for the pilot's reaction time. In this case an automatic system could be provided to monitor the output of the engines and institute the necessary emergency procedure when one of them fails.

When the aircraft is in STOL operation but is not in an extremely dangerous position, a different mode of operation may be used. In the above example, the remaining port engine could have the sweep path extended so that its actuator strip flap took over a portion of the wing span left without such a flap as a result of the engine failure. Further, the sweeps of the starboard engines could be suitably modified, so that the aircraft would remain in trim. Again, this procedure could be performed automatically with the pilot pre-selecting which of the two emergency systems would be used.

If certain of the engines are interconnected by ducts, the problem of redistributing the actuator strip flap is no longer important for those engines. Thus, if two engines like the one shown in FIG. 3 were mounted on either side of the fuselage and interconnected, the failure of one engine would not present a major control problem.

A true VTOL capability is not ordinarily needed in a transport jet aircraft since it would normally be operating from prepared landing fields. However, emergency situations do occasionally arise, when a VTOL descent could prevent a serious accident. Such descents can usually be made without excess fuel and so an emergency VTOL capability can be provided by the present invention without seriously compromising the design. The VTOL mode is described in conjunction with FIG. 5. The transition between this mode and ordinary flight may be accomplished using the mode of FIG. 4 as an intermediate step with corresponding starboard and port engines being converted by pairs.

Sweeping jet wing aircraft are so-called integrated aircraft in which the engine characteristics and the air frame characteristics must be considered simultaneously. Accordingly, the remainder of this specification deals with a type of sweep generator especially well adapted for the present aircraft and containing novel features arising from its use as an integrated thrust and lift producer.

A sweep generator that could be used as 9 in FIGS. 2 through 5 is shown in FIGS. 6, 7, and 8. FIG. 6 is a section through the sweep generator as viewed from the top. The nozzle 20 of the jet engine exhausts into a duct formed by a starboard airfoil 21 and a port airfoil 22. The top and the bottom ends of the duct are closed by end plates 23 and 24 respectively as can be seen in FIG. 7 which is a side view of a section of the sweep generator. The nozzle is shown as contracting two dimensionally; however, it is easy to obtain any desired contraction (or expansion) ratio by suitably forming the top and bottom of the nozle 20. The efflux of the jet 1 from 20 through the duct formed by 21, 22, 23, 24 produces an ejector pump action that draws air into the duct through the entrance openings as shown by the arrows 25 and 26. This condition could be used for the cruising flight mode of the aircraft without undue drag penalty especially if the airfoils 21 and 22 were provided with suitable adjustable means so that they could be spaced for optimum ejector action. Alternatively, these airfoils may be folded up or translated against the wall of the nozzle 20 to store them during cruising flight.

When it is desired to sweep the jet, two doors 27 and 28 may be rotated out from the sides of the nozzle 20 by suitable means, for instance by screw jacks 70 and 71 operated by fluidic control device shown schematically at 72, to partially occlude the airflow into the duct 25, 26. This lowers the pressure on either side of the jet. If the port door 28 is moved out further than the starboard door 27, then the flow 26 will be throttled more than 25, and the jet 1 will be deflected toward the port side. By continually changing the differential displacement between the two doors, 27, 28 the jet may be caused to sweep. Doors 27 and 28 could be made to oscillate continuously if fluidic control device 72 were replaced by a fluid amplifier type oscillating device.

However, it is not necessary to move the doors 27 and 28 to produce the sweeping motion of the jet. Instead two jet sheets 29 and 30 are provided near the leading edges of the airfoils 21 and 22. These jets are directed in toward the edges of the doors 27, and 28. Now, the jets aid in the throttling action of the doors. Therefore, by differentially throttling the jets 29, and 30, by means of fluidic control devices shown schematically at 80 and 81, a sweeping motion of the main jet 1 can be obtained. Similarly the directions of the jets 29, 30 may also be changed to produce differential throttling and hence sweeping of the main jet. The doors 27, 28 need only be adjusted slowly to create the proper size flow space for the jets 29, 30 depending on the effect of the free stream velocity produced by the forward motion of the aircraft.

To produce efficient sweeping action, it is convenient to have the nozzle about 4 times as high as it is wide. This can be seen by comparing FIGS. 6 and 7. A satisfactory actuator strip could now be formed from this coplanar, sweeping jet by allowing the jet to pass through a cascade of turning vanes. These vanes could be so positioned as to direct the entire jet along a conical sweep path at every point at its emergence at or near the trailing edge of airfoils 21, 22. However, such a cascade would be heavy and cumbersome and it would impose a large drag penalty on the jet. In the instant invention, this difficulty is avoided by the fact that only about one third of the jet need be turned downward about 30° to give the actuator strip effect. Therefore, flap 33 pivoted at 90 is provided in the lower end plate 24. This flap need not be large enough to turn the entire beam by the Coanda effect. I have determined that a moderate size flap will deflect the lower part of a 4/1 jet beam with acceptable distortion and losses near the center of the beam. (Actually, the top of the beam may be turned downward slightly by such a flap.)

FIG. 8 shows the flap 33 from an end view of the sweep generator. The flap is provided with port and starboard leaves 34, 35, hinged about the lines 36, 37. These leaves help in the formation of the actuator strip by directing the lower part of the jet into a conical sweep path. The region of space occupied by the actuator strip is partially controlled by the angular deflection of the leaves 34, 35 about the hinges 36 and 37. These leaves and flap 33 could be extended and retracted by suitable means, for example screw jacks 73 and 74 operated by fluidic device shown schematically at 75.

The sweep generator duct can also be fitted with a flap 38 pivoted at 91 and located in the upper end plate 23 as shown in FIGS. 7 and 8. It is not necessary to use this flap to deflect the jet downward to produce the downward going actuator strip. However, when this flap 38 is deflected downward, a larger downward deflection of the jet beam is possible. Thus this means may be used to produce the VTOL configuration described in connection with FIG. 5. To produce the upward going actuator strip for this case, flap 38 is provided with leaves 40 and 41 similar to 34, 35 of 33. These leaves are deflected upward as are 34, 35 by means of a fluidic control device shown schematically at 75 to give the upward going actuator strip, FIG. 5, while the flap 38 is positioned at less of a downward angle than is 33.

Flap 38 can be deflected upward by suitable means, for instance by screw jack 73 operated by fluidic control device 75, to provide the horizontal upward going actuator strip of FIG. 4. Furthermore, flaps 38 and 33 and leaves 34, 35, 40, 41, could be oscillated upward and downward in unison by suitable means, for instance by fluidic device 75, to produce the oscillating actuator strip flap previously described.

Next we will discuss a most important feature of the present invention. This concerns the concept of staging whereby one stage of thrust, or lift augmentation by a sweeping jet may be followed by a second stage of thrust or lift augmentation. Several stages may be thus used with or without an intermediate action by an aerodynamic surface. It is by this mechanism that the instant invention produces a greater thrust to weight propulsion system that is compatible with the STOL requirements. The aerodynamic structures used in the sweep generator are now utilized for the cruising flight and control of the aircraft and so their weight, volume and frontal area may be charged off to the thrust producer proper.

FIG. 9 shows a section of a sweep generator with a nozzle 20 and doors 27, 28 similar to that shown in FIG. 6. However, the airfoils 21, 22 of FIG. 6 have been changed to substantially elliptical profiles 42, 43, with a more elaborate jet blowing control system. The efflux of this primary sweep generator, 20, 42, 43 passes between two additional airfoils 44, 45 arranged in a plane parallel to 42, 43. All four airfoils are enclosed by two end plates the lower one 46 being visible in FIG. 9. The airfoils 42, 43 contain throttling jets 29, 30 as in FIG. 6. By modulating these jets, the main jet can be swept back and forth in the region between 44, 45. Thus a waving jet sheet effect is produced in this region. As taught in connection with FIG. 8 of my U.S. Patent 3,168,997, this heating jet sheet induces an airflow past airfoils 44, 45 and thus a thrusting force may be realized on these airfoils if they are properly designed. These airfoils thereby perform the function of the bypass duct for a ducted fan augmented turbojet engine in the cruising mode. However, the rigid propeller blades of such a ducted fan are absent and thus the cruising thrust to weight ratio of the beating jet sheet arrangement may exceed that of a ducted fan employing solid rotor blades. Furthermore, there are no mechanical speed limitations on the beating jet sheet as occur with solid blades, and there are no mechanical pitch adjustment problems. Thus, hotter jet temperatures may be used with gas bypassing the turbine.

Extremely complex phenomena can be made to occur within the duct bounded by the airfoils 44, 45 by simply varying the sweep function of time (or the momentum) of the primary jet issuing from airfoils 42, 43. Thus, for STOL operation the duct of 44, 45 may produce thrust augmentation in conjunction with sweep generation for the autuator strip. For example, the regular beating action of the primary jet induces an inflow 48, 49 into the duct region providing thrust augmentation. This inflow would move through the duct and exit as the secondary jet at the mid-point of the sweep path. Now by using an asymmetric sweep, e.g. slow to starboard fast to port, the outflow from the duct can be deflected, causing the secondary jet 1' to sweep. As the angle of the output jet increases, the primary jet issuing from 42, 43, can be directed onto the trailing edge of one of the airfoils 44 or 45. This jet now provides a turning guide for the secondary jet thus further increasing its angle of sweep. During this process, short excursions to the opposite side of the duct 44, 45 can be made by the primary jet to keep the inflow from reversing and to prevent excessive losses at the trailing edge of the opposite side airfoil. By continually repeating this process, first to one side then to the other, both thrust augmentation and a sweeping secondary jet may be obtained. Thus the duct thrust augmentation occurs in the near zone of the jet before extensive frictional losses take place, while the actuator strip may be formed in the far zone well away from the nozzle exit region as long as sufficient energy remains in the jet.

The duct airfoils 44 and 45 may be made movable to aid in the efficiency of the above described process. In particular it is convenient to provide these airfoils with movable leading edge flaps 50, 51 and trailing edge flaps 52, 53, similar to the flaps shown in FIG. 2. The leading edge flaps 50, 51 may be opened outward to increase the amount of inflow at low flight speeds when relatively more energy is available in the primary jet for thrust augmentation. Similarly, the trailing edge flaps 52, 53 may be opened outward to increase the diffuser action of the duct at low speeds. These flaps in the opened position will also aid in the sweep angle multiplier effect that occurs for example when the jet contacts the flap at 55. For cruising flight the flaps 50, 51, 52, 53 are returned to their closed positions to reduce the drag of the duct.

The formation of an actuator strip from the sweeping jet issuing from the duct of 44, 45 may be produced by a flap 54 formed in the lower end plates 46. This flap functions in a manner similar to the flap 33 of FIG. 8, and is provided with leaves 56 corresponding to 34 and 57 corresponding to 35. If a flap corresponding to 38 is added to the top end plate of the duct the output jet of the device of FIG. 9 can perform all of the functions described for the sweep generator of FIGS. 6, 7, 8, provided there is sufficient energy available in the jet output beam.

The flap 54 or 33, 38, may be modified, however, to provide faster response and hence a better oscillating actuator strip flap or better control. Such a modification is shown in FIG. 10. This figure is a side view of the section through the new flap 58. This flap is provided with a control nozzle 59 communicating with a duct 60 built into the end plate 46. The pressure in the duct 60 is controlled by a valve or other means. When the duct is at low pressure, the output jet sticks to the flap 58 thereby creating a downward going actuator strip (provided that the jet is sweeping and not deflected fully upward by the corresponding top flap). When the pressure in the duct is increased sufficiently, however, the jet beam is no longer deflected by the flap 58. Thus, by controlling the pressure in the duct 60 the downward going actuator strip may be rapidly formed or destroyed.

FIG. 11 shows a section of sweep generator airfoil 43 in greater detail. This airfoil is provided with a BLC jet 62 at the leading edge issuing from the pressurized duct 63. This jet prevents nose losses when the throttling action is not being used. Similarly a jet 64 from duct 65 prevents excessive losses from occurring at the trailing edge of 43. A separate nozzle 66 fed by duct 67 is located inside and at approximately right angles to the jet 62. Thus when duct 67 is pressurized, the jet 62 is forced to separate from the airfoil and produce the throttling effect of jet 29. Therefore, varying the pressure in duct 67 causes the jet to sweep. The separated flow caused by the jet 29 will form a vortex 68. Further applications of BLC or the shaping of 43 will help to stabilize this vortex and further reduce the losses associated with sweep generation.

Small, regular variations of the pressure in duct 67 will cause travelling waves to propagate down the BLC jet 62. These waves produce a waving jet sheet pumping effect that will increase the efficiency of the BLC effect of jet 62 provided that the pressure in the duct 67 does not get high enough to detach the jet 62 from the surface of 43.

Thrust reversal, shroud cooling and other necessary auxiliary devices needed for the jet engine may be provided for in the usual way without incompatibility with the sweep generators described above. The sweep generator and duct greatly reduce the noise of the jet and so an additional muffling device is not ordinarily required.

Although but a few embodiments of the present invention have been illustrated and described it will be apparent to those skilled in the art that various changes and modifications may be made therein without departing from the spirit of the invention or from the scope of the appended claims.

I claim:

1. A method of inducing a flow in a fluid by means of a jet efflux within the fluid, the direction of the induced flow being transverse to the direction of the jet efflux, comprising:
   increasing the enthalpy of a portion of the fluid;
   venting the increased enthalpy fluid as a jet into surrounding fluid; and
   sweeping at least part of the fluid jet transversely to its vented direction to induce a fluid flow transversely of the direction of the jet efflux and the direction of sweeping, independently of any propulsion generated by jet producing structure per se.

2. The method of inducing fluid flow of claim 1 wherein the step of sweeping at least part of the fluid jet comprises:

sweeping a part of the fluid jet through a segment of a conical arc.

3. The method of inducing fluid flow of claim 1 wherein the step of sweeping at least part of the fluid jet comprises:
sweeping at least part of the fluid path contained entirely by a volume of space bounded by an imaginary plane containing the origin of the jet efflux, said imaginary plane lying substantially at right angles to the average direction of the sweeping jet efflux.

4. The method of inducing fluid flow of claim 1 wherein the step of sweeping at least part of the fluid jet comprises:
sweeping at least part of the fluid jet by the action of a beating jet sheet.

5. The method of inducing fluid flow of claim 1 wherein the step of sweeping at least part of the fluid jet comprises:
sweeping at least part of the fluid jet by the action of a second jet sweeping to produce transverse flow.

6. The method of inducing fluid flow of claim 5 wherein the step of sweeping at least part of the fluid jet comprises:
periodically reversing the direction of flow induced by the second jet to produce a beating actuator strip.

7. The method of inducing fluid flow of claim 1 wherein the step of sweeping at least part of the fluid jet comprises:
periodically reversing the direction of flow induction to produce a beating actuator strip thereby inducing an augmented flow in the same approximate direction of the jet.

8. The method of inducing fluid flow of claim 1 wherein the step of sweeping at least part of the fluid jet comprises:
oscillating at least part of the fluid jet transversely to its vented direction.

9. The method of inducing fluid flow of claim 1 wherein the step of sweeping at least part of the fluid jet comprises:
continuously sweeping at least part of the fluid jet transversely to its vented direction.

10. A method of inducing a flow in a fluid by means of a jet efflux within said fluid, the direction of the induced flow being transverse to the direction of the jet efflux, to produce a stable actuator strip, comprising the steps of:
increasing the enthalpy of a portion of the fluid;
venting the increased enthalpy fluid as a jet into surrounding fluids;
maintaining the direction of flow of part of the fluid jet in the vented direction; and
sweeping only a part of the fluid jet transversely to the vented direction of said fluid jet to induce a fluid flow transversely of the direction of the jet efflux and the direction of sweeping, independently of any propulsion generated by the jet producing structure per se.

11. The method of inducing fluid flow of claim 10 wherein the step of sweeping only part of the fluid jet comprises:
sweeping a part of the fluid jet through a segment of a conical arc.

12. The method of inducing fluid flow of claim 10 wherein the step of sweeping only part of the fluid jet comprises:
sweeping only part of the fluid path contained entirely by a volume of space bounded by an imaginary plane containing the origin of the jet efflux, said imaginary plane lying substantially at right angles to the average direction of the sweeping jet efflux.

13. The method of inducing fluid flow of claim 10 wherein the step of sweeping only part of the fluid jet comprises:
sweeping only part of the fluid jet by the action of a beating jet sheet.

14. The method of inducing fluid flow of claim 10 wherein the step of sweeping only part of the fluid jet comprises:
sweeping only part of the fluid jet by the action of a second jet sweeping to produce transverse flow.

15. The method of inducing fluid flow of claim 14 wherein the step of sweeping only part of the fluid jet comprises:
periodically reversing the direction of flow induced by the second jet to produce a beating actuator strip.

16. The method of inducing fluid flow of claim 10 wherein the step of sweeping only part of the fluid jet comprises:
periodically reversing the direction of flow induction to produce a beating actuator strip thereby inducing an augmented flow in the same approximate direction of the jet.

17. The method of inducing fluid flow of claim 10 wherein the step of sweeping only part of the fluid jet comprises:
oscillating only part of the fluid jet transversely to its vented direction.

18. The method of inducing fluid flow of claim 10 wherein the step of sweeping only part of the fluid jet comprises:
continuously sweeping only part of the fluid jet transversely to its vented direction.

19. The method of inducing fluid flow of claim 10 wherein the step of sweeping only part of the fluid jet comprises:
sweeping only approximately one-third of the jet efflux along the path with a coning angle of approximately 30 degrees to produce a stable actuator strip substantially similar to that produced by a jet whose entire efflux is at said approximately 30 degree coning angle.

References Cited
UNITED STATES PATENTS 3,194,512  7/1965  Saunders _____ 244—23
3,276,724  10/1966  Saunders _____ 244—12

EVERETT W. KIRBY, *Primary Examiner.*